April 24, 1951 J. W. WILLIAMSON 2,549,876
ROTARY CHOPPER-TYPE HAY BREAKER
Filed Nov. 13, 1945 2 Sheets-Sheet 1

J. W. WILLIAMSON
INVENTOR.

BY
ATTORNEY

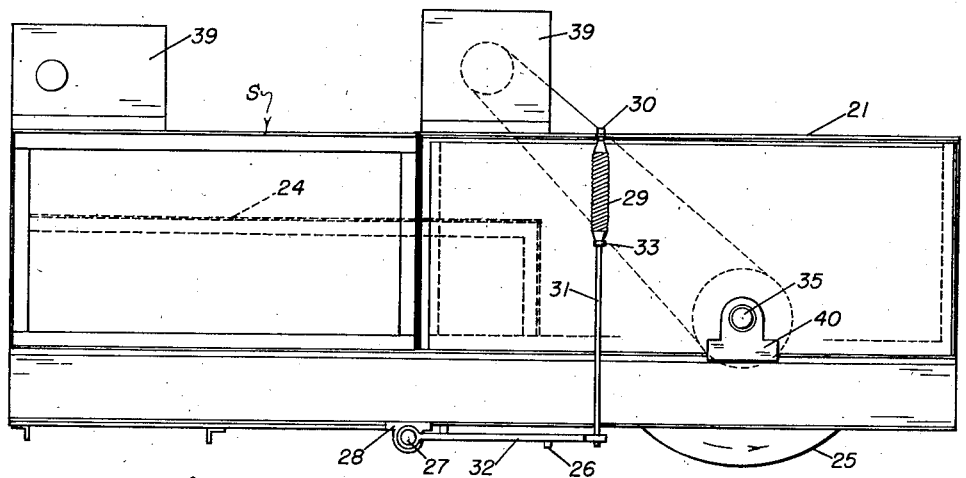
Fig. 4
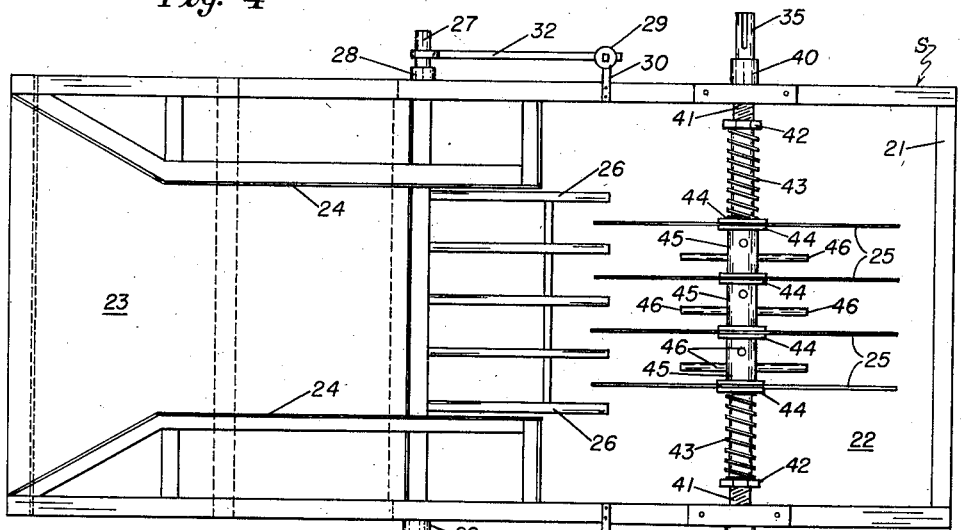
Fig. 3
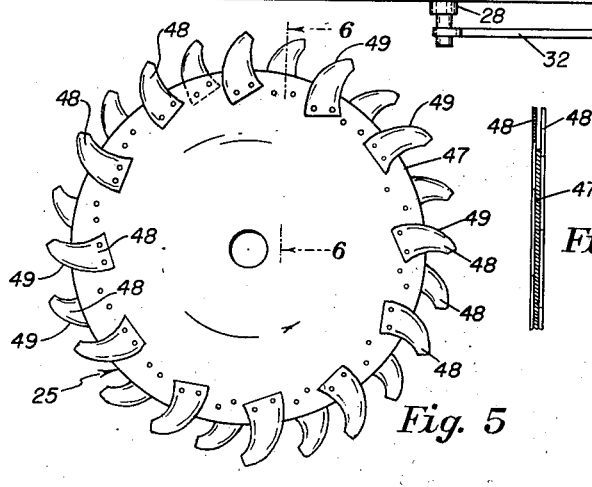
Fig. 5
Fig. 6
J. W. WILLIAMSON
INVENTOR.
BY
ATTORNEY Patented Apr. 24, 1951

2,549,876

UNITED STATES PATENT OFFICE 2,549,876

ROTARY CHOPPER-TYPE HAY BREAKER

John W. Williamson, Los Angeles, Calif.

Application November 13, 1945, Serial No. 628,017

2 Claims. (Cl. 146—117)

This invention relates to apparatus for subdividing compressed forage, and more particularly to apparatus for subdividing baled hay prior to feeding the same into a comminuting machine, such as a hammer mill of the type disclosed and claimed in my co-pending applications, Serial No. 564,929, filed November 24, 1944, now Patent No. 2,505,023, and Serial No. 604,807, filed July 13, 1945, now abandoned.

In the treatment of forage, such as hay, it is often desirable to be able to cut and gather, and then store the forage in a convenient place until utilized as feed for stock, the comminuted or finely divided hay comprising an excellent feed for sheep and similar animals. However, it is often necessary to gather the hay from the field in a relatively short time and it often happens that such time is insufficient for a complete comminuting process. Also, it is often necessary to transport the hay a substantial distance, as in instances in which the point at which the animals are fed is remote from the point at which the hay is grown. For simplicity in transportation and handling, it is desirable to compress the hay into bales which occupy considerably less space than loose hay, and therefore may be transported and stored with greater facility. Compressed forage, such as bales of hay, fed into a comminuting machine of the type described and claimed in my aforesaid co-pending applications, tend to block and sometimes even stop the machine. Hay cut from a stack, without being torn apart, has the same tendency. Thus, while the apparatus of this invention will be described in connection with subdividing baled hay, it will be understood that it is applicable to similar treatment of other compressed forage, such as hay from a stack.

Among the objects of this invention are to provide novel apparatus for subdividing compressed forage, such as baled hay; to provide such apparatus which may be set up with relative ease and facility; to provide such apparatus which has a relatively high range of feed and output; to provide such apparatus which requires only a small amount of attention from the operator; to provide such apparatus which will efficiently subdivide the compressed forage into sufficietly small fragments to feed a hammer mill or the like, without any tendency for the hammer mill to become choked or overloaded; to provide such apparatus in which adequate provision is made for preventing scrap iron or similar relatively heavy metallic parts from injuring the parts thereof; to provide such apparatus which may be set up directly in conjunction with a hammer mill for comminuting such forage; and to provide such apparatus which is simple and effective in operation and relatively low in cost. The above and additional objects and the features of this invention will become apparent from the description which follows.

Apparatus for subdividing compressed forage, constructed in accordance with this invention, may include slicing means for producing elongated sections of forage, beating means for loosening and separating the sections into fragments, and conveyor means for feeding compressed forage to the slicing means and also for removing the fragments from the beating means. Preferably, such apparatus includes a feed conveyor, a slicing and beating section, and a discharge conveyor extending beneath the slicing and beating section to receive the fragments by gravity and deliver the same to a desired point. Other features, such as the preferred construction of the slicing means and beating means, and the provisions for removing scrap iron and the like, are incorporated in the apparatus illustrated in the accompanying drawings, in which:

Fig. 3 is an enlarged top plan view of the slicing and beating section of the apparatus of Fig. 1, with the top cover removed to show the interior construction thereof;

Fig. 4 is an enlarged side elevation of the slicing and beating section;

Fig. 5 is a side elevation of a disc saw, a plurality of which are installed in the slicing and beating section; and Fig. 6 is a partial cross section taken along line 6—6 of Fig. 5.

Figure 1:
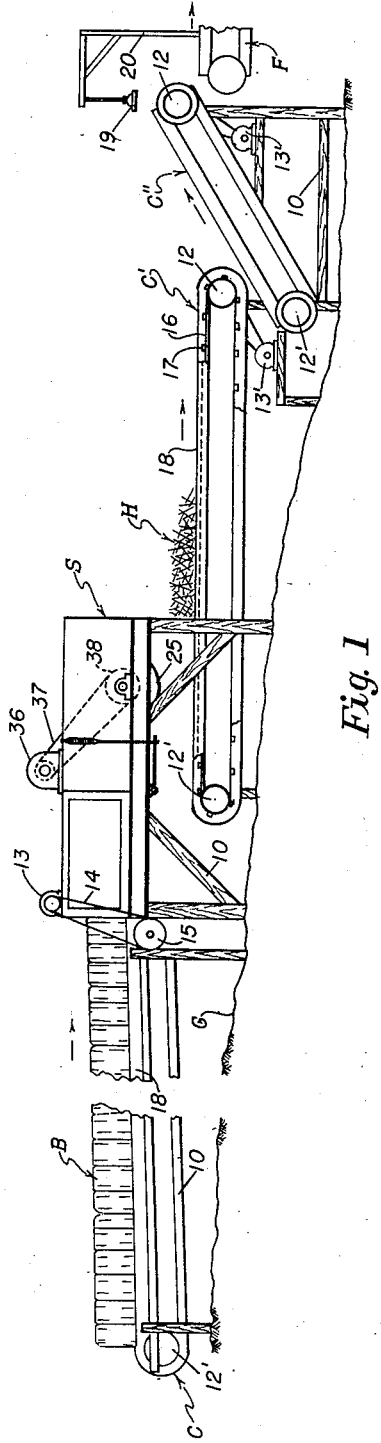
Fig. 1 is a side elevation of apparatus constructed in accordance with this invention.
Figure 2:
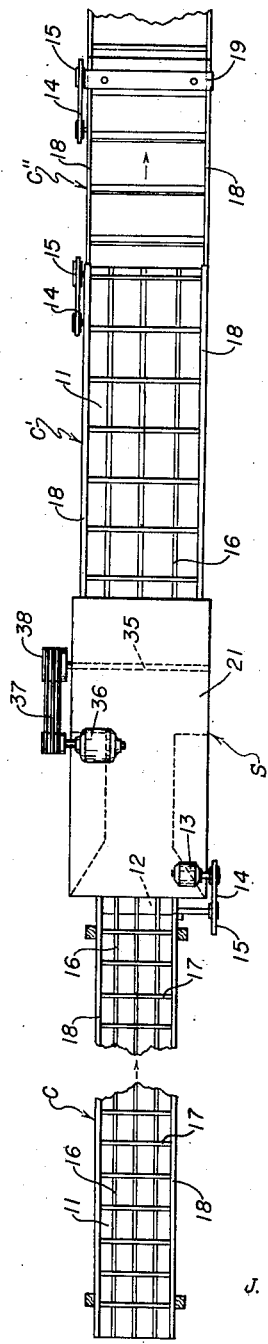
Fig. 2 is a top plan view of the apparatus of Fig. 1.

Apparatus for subdividing compressed forage, constructed in accordance with this invention, is exemplified by a haybreaker, such as illustrated in Figs. 1 and 2, which comprises a feed conveyor C adapted to deliver bales B of hay to a slicing and beating section S from which the subdivided fragments fall onto a discharge conveyor C'. The apparatus may be set up in a suitable position, as on ground G so that the discharge conveyor C' will feed an auxiliary conveyor C'', in turn adapted to supply the subdivided fragments to a feeding section F of a hammer mill, such as of the type disclosed and claimed in my said co-pending applications, Serial Nos. 564,929 and 604,807. It will be evident, of course, that the delivery end of discharge conveyor C' may be elevated to any desired position for feeding the fragments to storage, or a suitable position for feeding the fragments to cattle or the like, although the apparatus of this invention is most useful in conjunction with the aforementioned hammer mill or the like.

Each conveyor C, C' and C'' may be similar in construction and may include a framework 10 for supporting a bed 11 formed of boards or the like, covered with metal if desired, and extending longitudinally of the conveyor. At opposite ends of the respective framework, rollers 12 and 12' are mounted for rotation about a suitable axis, and either or both rollers are driven in a suitable manner, preferably roller 12. Thus, a motor 13 or 13' may drive roller 12 of each conveyor through a belt 14 and a pulley 15. Motor 13 is mounted atop slicing and beating section S, and the motors 13', for conveyors C' and C'', may be suitably mounted on the framework 10 as shown.

A plurality of longitudinally extending strips 16, such as three in number, move along bed 11 of each conveyor, and transverse bars 17 are attached to strips 16 to carry the load along, such as either bales B of hay on feed conveyor C, or subdivided fragments of hay H on conveyors C' and C''. The hay is prevented from slipping sideways off the beds 11 by sideboards 18. It will be understood, of course, that any other type of conveyor may be utilized, and also that a relatively permanent installation may be made, when desirable.

Scrap iron, and similar relatively heavy extraneous matter which might damage the operating parts of the haybreaker or the hammer mill, is removed at section S in a manner explained below, while any iron or magnetic extraneous matter which escapes therefrom is removed by an electromagnet 19, suspended from a support 20 above the upper end of auxiliary conveyor C''.

The operating parts of the slicing and beating section S, as illustrated in greater detail in Figs. 3 and 4, are installed within a housing 21, preferably formed of sheet metal or the like, and having a closed top and sides, but a bottom opening 22 extending over approximately the rear half thereof. As the bales B, the wire normally around the same having previously been removed, are pushed by conveyor C onto an apron 23, angle irons 24 guide the bales into engagement with a plurality of slicing saws 25. Angle irons 24 are mounted at a suitable level, such as shown in dotted lines in Fig. 4, and also converge for a short distance at the front end of section S, as in Fig. 3. Between the rear end of apron 23 and the slicing saws 25, a lattice 26 is attached at one end to a shaft 27, in turn pivoted in bearings 28 mounted on the underside of the section S and adapated to be moved downwardly by scrap iron, rocks, or other extraneous matter considerably heavier than the hay. The lattice 26 is moved downwardly against the force of coil tension springs 29, one spring 29 being provided on each side of the apparatus and each spring being attached at its upper end to a spring support 30, and at its lower end to a vertical rod 31, in turn mounted on the free end of an arm 32, which extends from shaft 27. The upper end of rod 31 is threaded, so that the tension of each spring 29 may be adjusted by a nut 33.

The saws 25 are mounted for rotation on a shaft 35, which is rotated by a motor 36, through belts 37 and pulley 38, as in Fig. 2. Motor 36 is mounted atop the housing 21, and each of motors 13 and 36 may be enclosed by a housing 39, as in Fig. 4, while shaft 35 is mounted in bearings 40 attached to housing 21 at opposite sides of opening 22. The saws 25 are rotated at a relatively high speed, but because of the variation in load imposed by succeeding bales of hay, a frictional drive between shaft 35 and the saws 25 is provided. For this purpose, the portions of shaft 35 adjacent bearings 40 are provided with threads 41, on which nuts 42 are adjustable inwardly and outwardly, while nuts 42 compress springs 43, which encircle shaft 35, against washers 44 forming friction discs. A washer 44 is mounted on each side of each saw 25, to provide a frictional drive for the saws and also for sections 45 of pipe or the like, which are interposed between the saws. Pipe sections 45 space the saws in the desired positions, and also provide a mounting for the beating means, which includes studs 46 attached to and extending radially from pipe sections 45. The number of saws may be varied, if desired, although four saws, as shown, are desirable for conventional hay bale sizes.

Each slicing saw, as in Figs. 5 and 6, may comprise a circular disc 47 provided with a plurality of teeth 48, attached to the disc adjacent the periphery thereof in a suitable manner, as by bolts or by rivets, as shown. Alternate teeth are disposed on opposite sides of the disc, as in Fig. 6, and the teeth are also sharpened along a forward edge 49, which curves rearwardly from the edge of the disc, as in Fig. 5. Thus, there will be little tendency for clogging or fouling of the teeth, as each disc is rotated in the direction of the arrow of Fig. 5. Also, the alternate spacing of the teeth produces a periodic chopping effect which enhances the slicing operation, and increases the capacity of the apparatus.

As indicated above, the beating means includes a plurality of studs 46, which may be rods or short lengths of shafting, pipe, or the like. As shown, there are four studs 46 on each pipe section 45, the studs being spaced radially 90° apart, and one pair of opposite studs also being spaced laterally from the pair of opposite studs 90° therefrom.

As each bale of hay passes into the saws 25, it is sliced into longitudinal sections by the saws, and each section is separated and thereby reduced to fragments by the beating studs 46. As is evident, the beating studs are interspersed between the saws, and are shorter than the radius of the saws. This permits the bale to be sliced into sections before passing to the beating studs 46, but at the same time, each longitudinal section remains attached to the remainder of the bale until slicing is complete. The beating studs thereby operate on the ends of supported sections, so that fragments of hay are readily torn from the sections, to drop downwardly onto conveyor C'. Any fragments which tend to be retained on the studs are discharged by centrifugal force and fall downwardly onto conveyor C'.

Saws 25 extend forwardly above lattice 26, but are spaced therefrom at the lower end, as in Fig. 4, so that the compressed forage will pass more readily to the saws. In the event that relatively heavy extraneous matter having a specific gravity higher than the forage, such as iron, is carried by the conveyor C to the slicing and beating section S, it will depress lattice 26 and fall onto the lower conveyor C'. If such extraneous matter is not observed by the operator and removed from the discharge conveyor C', it will be caught by electromagnet 19 as it passes over the top of auxiliary conveyor C''. Also, lattice 26 permits each bale to tip slightly as it is first engaged by the saws, thereby reducing the initial stress on the saws.

In the event that the hay is tougher than expected, or for any other reason, the saws tend to become overloaded, instead of stopping or unduly slowing motor 36, the discs of the saws 25 will tend to slip slightly between washers 44.

From the foregoing, it will be evident that the apparatus of this invention is relatively simple in construction but highly effective in operation and fulfills to a marked degree the objects and requirements hereinbefore set forth. The relatively high speed of the saws 25, coupled with the friction drive thereof, insures that each bale will be readily cut into longitudinal sections, and the beating studs 46 driven from the same shaft as the saws will effectively complete the subdivision of the forage. The apparatus may readily be set up at any desired place, and requires little attention from the operator, except to feed the bales of hay thereto.

The preferred construction of the saws is of importance in assuring trouble-free operation, since a relatively wide cut, or kerf, is produced. There is little danger of any one of the saws becoming obstructed, due to the alternate spacing of the saw teeth and the space therebetween. Such construction is of particular advantage in cutting relatively resilient material such as hay.

It will be understood that various changes may be made. For instance, the drive arrangement may be varied, the type of drive may vary from that shown, the type of conveyor utilized may vary considerably from that disclosed, and different constructions and arrangements of the saws and beaters may be utilized. It will further be understood that various additional changes may be made, and that other embodiments of this invention may exist, all without departing from the spirit and scope of this invention.

What is claimed is:

1. In apparatus for subdividing compressed forage, a shaft; a plurality of saws comprising circular saw discs mounted in spaced positions on said shaft and a plurality of teeth attached to the periphery of each disc; a plurality of sleeves surrounding said shaft and extending laterally between said discs; a plurality of studs extending radially from each said sleeve and having a length less than the radius of said discs; a friction disc on opposite sides of each saw disc between said sleeves and said saw discs; said saws, sleeves, and friction discs being loosely mounted on said shaft; adjustable compression means including an axially yielding member bearing against the end friction discs; means for rotating said shaft; and means for feeding compressed forage to said saws.

2. Apparatus for subdividing compressed forage comprising a shaft, a plurality of axially spaced disc saws mounted on said shaft, spacing means between each of said saws, a friction disc on opposite sides of each saw disc between said spacing means and said saw discs, said saws and spacing means and friction discs being loosely mounted on said shaft, axially resilient compression means mounted on said shaft outwardly of each of the outer disc saws, and adjustable means rotatable with said shaft for varying the compression of said resilient means on said outer disc saws whereby said disc saws will slip relative to said shaft under a predetermined load.

JOHN W. WILLIAMSON.

REFERENCES CITED

The following references are of record in the file of this patent:

UNITED STATES PATENTS

| Number | Name | Date |
| --- | --- | --- |
| 285,422 | Lockhart | Sept. 25, 1883 |
| 564,747 | Gutenhunst | July 28, 1896 |
| 995,689 | Landis | June 29, 1911 |
| 1,061,920 | Monroe | May 13, 1913 |
| 1,371,825 | Uhlig | Mar. 15, 1921 |
| 1,443,276 | Roberts | Jan. 23, 1923 |
| 1,769,310 | Rider | July 1, 1930 |
| 1,840,749 | Stressu | Jan. 12, 1932 |
| 1,844,279 | Gossard | Feb. 9, 1932 |
| 1,908,548 | Smith | May 9, 1933 |
| 2,153,467 | Hauke | Apr. 4, 1939 |
| 2,156,047 | Arnold et al. | Apr. 25, 1939 |
| 2,209,268 | Gounlock | July 23, 1940 |
| 2,367,063 | Shallock | Jan. 9, 1945 |